April 18, 1967

D. R. HOUGH 3,314,839

PROCESS OF RECAPPING A WORN PNEUMATIC TIRE
USING CORD-STITCHED CAMELBACK

Filed Feb. 8, 1963

INVENTOR.
DEAN R. HOUGH
BY
*William J. Ruano*
his ATTORNEY

United States Patent Office 3,314,839
Patented Apr. 18, 1967

3,314,839
PROCESS OF RECAPPING A WORN PNEUMATIC TIRE USING CORD-STITCHED CAMELBACK
Dean R. Hough, Pittsburgh, Pa., assignor to Washington Rubber Company, Washington, Pa.
Filed Feb. 8, 1963, Ser. No. 257,132
9 Claims. (Cl. 156—87)

This invention relates to a vehicle tire construction and, more particularly, to an improved tread rubber or camelback and method of making the same, for use in recapping worn tires. The present invention is an improvement over that shown in my prior Patent No. 3,024,827, dated Mar. 13, 1962.

In said prior patent there is disclosed a separate layer of cord in the form of a net which is draped around a worn tire and sandwiched between the tire and the gum layer of the camelback. The application of such cord involves some difficulty particularly in wrapping the cord about the entire perimeter of the tire so as to extend radially inwardly by the same amount throughout the entire circumference of the tire, and further difficulty in having to cut different lengths of cord for different tire sizes and for joining or lapping the ends of a length of cord. These operations for applying the cord obviously reduce the speed of recapping the tire and presents difficulties and disadvantages to recappers who are unaccustomed to handling such cord.

An object of the present invention is to overcome the above named disadvantages by knitting or stitching the cord in the tread rubber or camelback so as to effectively expel air which is otherwise entrapped between the tire casing and the tread rubber, also to knit the cord in such pattern that it will expel all the trapped air in the tire during recapping and during use of the recapped tire.

A further object of the present invention is to provide a novel method of applying cord to tread rubber throughout its thickness while still hot from the extrusion process of the rubber so as to avoid the necessity of cooling the tread rubber during its manufacture before applying the cord, also so as to enable use of the camelback with embedded cord in the normal way, that is, by removal of the polyethylene protective layer which covers the cushion gum layer.

Other objects and advantages will become more apparent from a study of the following description taken with the accompanying drawing wherein.

The most serious problem arising from retreaded tires, and which has plagued the tire recapping industry for years, is that of the great tendency of separation of the retread rubber from the casing. This is a very dangerous situation which will generally result in abnormal wear and blow outs and has caused many injuries and deaths on highways.

I have made the discovery that the main reason for such separation is the tendency of very small air pockets to form between the casing and the tread rubber during the recapping process. Such pockets are not detected by present known methods except by cutting the tire which of course, is a destructive and impractical way of testing for such pockets.

Figure 1:
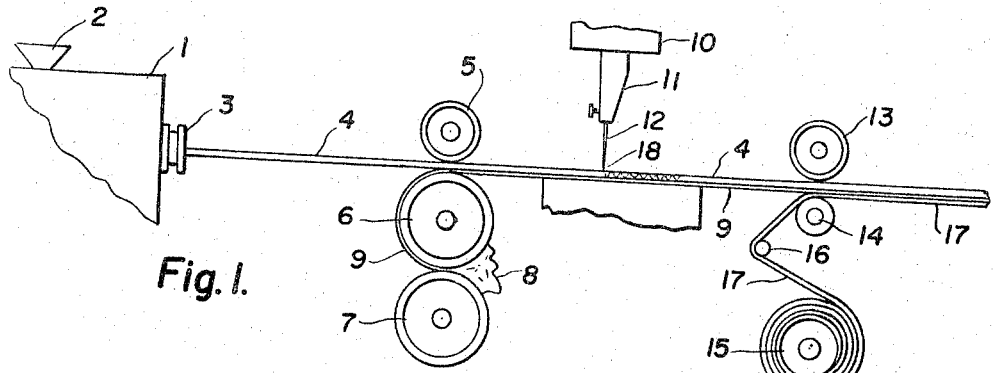
FIG. 1 is a diagrammatic showing of a method embodying the present invention for knitting cord throughout the thickness of the tread layer immediately after it is extruded.

Referring more particularly to FIG. 1 of the drawing, numeral 1 denotes an extruder into which rubber is fed through a funnel 2 and is extruded through an extruding head 3 in the form of a strip 4 of tread rubber. Such extruders are conventional in the art and, per se, form no part of the present invention. Between a pair of rolls 5 and 6, the tread rubber 4 is fed and a mass of cushion gum rubber 8 is fed between rolls 6 and 7 so as to form a layer 9 of cushion gum which is adhered to the tread layer 4 and which is very tacky so that it may be readily adhered to the roughened surface of a worn tire.

In accordance with the present invention, while the tread rubber 4 is still very hot from the extrusion process and while it has a cushion gum layer 9 adhered thereto, a sewing machine 10 having a head 11 and needle 12 and a table portion extending underneath layer 9 sews or knits cord, preferably cotton cord or other multi-filar cord through which air can seep, in a manner so that the cord will form stitches or loops 18 extending throughout the entire thickness of the tread rubber 4. This may be done either inclusive or exclusive of the thickness of the gum rubber 9. That is, in some instances the sewing may be accomplished, instead, between extruder head 3 and rolls 5 and 6 in which case, of course, the cord will be knitted throughout the thickness of only the tread rubber 4. Finally a protective plastic layer 17, such as polyethylene, is applied to cover and protect the tacky cushion gum layer 9 and may be fed from a roll 15 of plastic material and through idler rollers 16 and 14.

Figure 2:
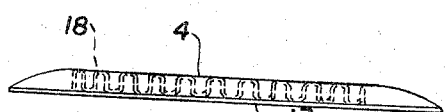
FIG. 2 is an end view of the finished camelback or tread rubber with the cord knitted or sewn therein.
Figure 3:
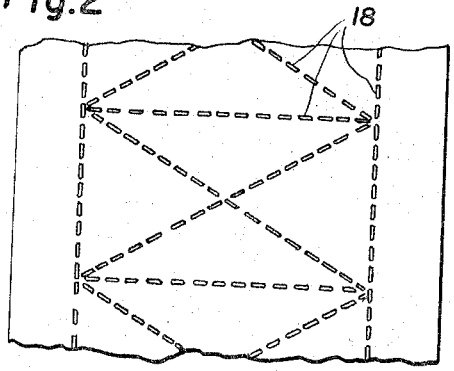
FIG. 3 is a fragmentary, top or plan view of a portion of the tread rubber or camelback shown in FIG. 2 illustrating a typical knitting pattern.

The final product will be tread rubber or camelback such as shown in FIGS. 2 and 3, which is in the form of a long strip spirally wound into a roll for sale to recappers for use in recapping old tires.

FIG. 3 shows an outline of knitted cord 18 having rows of stitching extending along the shoulder covering portions of the tire and diagonally extending rows as well as rows extending across and at right angles to the shoulder covering portions. In some cases, either the diagonal rows or the cross rows may be omitted. Of course, other designs than that shown may be used for the purpose of uniformly distributing the cord throughout the tread rubber in a manner so as to provide air leakage paths that will completely cover such portions of the worn tire in which air entrapment is likely. The side edge or shoulder portions are particularly vulnerable to air pockets.

Figure 4:
FIG. 4 is a cross-sectional view of a worn tire on which a layer of camelback having embedded cord, such as shown in FIG. 2, has been applied and adhered just before placing in the recapping mold; and, FIG. 5 is a cross-sectional view showing the tire of FIG. 4 as it is being molded in the final stage so as to acquire a tread design.

When the recapper receives the camelback or tread rubber in the form shown in FIGS. 2 and 3, he will first buff or roughen the worn tread surface 21, as shown in FIG. 4, and, with a needle, he will pierce holes 20a throughout the thickness of the remaining rubber until the plies of cord in the tire carcass are reached. Then the recapper peels off the polyethylene protective layer 17 and adheres the cushion gum layer 9 to roughened layer 21 in the manner shown in FIG. 4.

Figure 5:
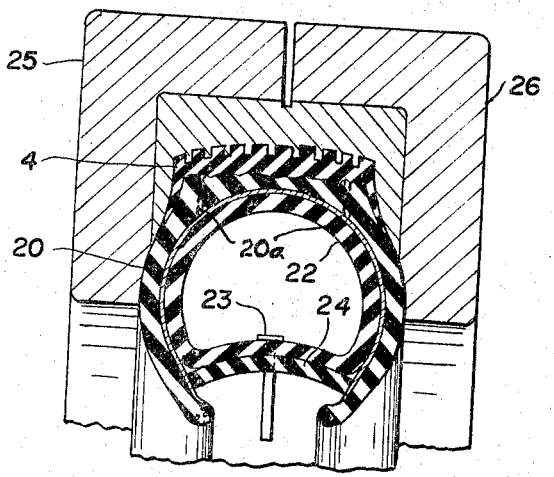

Then the capped tire is placed in a mold, such as shown in FIG. 5 comprising mold halves 25 and 26 containing a metal liner for molding the desired tire design on tread rubber 4. The tread rubber is pressed against such liner by means of an air bag 22 into which air is introduced through stem 23. Any air that is trapped in the worn tire will escape through holes 20a to the tread layer and thence will escape through knitted cord 18 to the outer surface of the tread layer or camelback and thus avoid any possibility of separation of the tread rubber from the worn tire during use of the recapped tire.

The cord is preferably cotton cord for wrapping packages for mailing, or rayon or other multi-filar material forming passageways for the escape of air.

While the present invention has been described in connection with recapped tires, it is also useful in the production of new tires inasmuch as the tread layer may be made in the same or a similar manner.

Instead of knitting cord through the thickness or at least a substantial part of the thickness of the tread rubber, a mat of cord or fibrous material embedded in the tread rubber may be used instead to provide a leakage path for air throughout the thickness of the tread rubber. In some instances, random oriented short lengths of cord, that is of about 1 inch, more or less, may be used to span the thickness of tread rubber with air escape passages.

Thus it will be seen that I have provided a novel tread rubber or camelback construction, and method of manufacture, to effectively rid tires of entrapped air either from manufacture or use of the tire and thus minimize or prevent any tendency of separation of the tread layer from the base layer of the tire; furthermore, I have provided a novel method of making such camelback while the tread rubber is still hot, so as to considerably speed and reduce costs of manufacture; furthermore I have provided a camelback construction that has embedded throughout the thickness thereof, knitted cord arranged in a pattern so as to provide escape paths for all air pockets that might form from manufacture or use and thereby prolong the life of the recapped tire by many fold as well as to save lives by insuring against blowouts caused by separation of the tread rubber particularly when driving at high speeds during hot summer temperatures.

While I have illustrated and described several embodiments of my invention, it will be understood that these are by way of illustration only, and that various changes and modifications may be made within the contemplation of my invention and within the scope of the following claims.

I claim:

1. A rubber tread layer for vehicle pneumatic tires having cord stitched throughout the entire area and substantially the entire thickness of the tread layer, said cord being of a material which allows air to seep therethrough.

2. Camelback for recapping worn vehicle pneumatic tires, said camelback having cord stitched along the shoulder portions thereof throughout the entire thickness of tread rubber, said cord being of a material which will provide an air escape path through said tread rubber.

3. Camelback as recited in claim 2 together with rows of stitching of said cord extending transversely between said cord stitched along the shoulder portions.

4. Camelback as recited in claim 2 together with rows of stitching of said cord extending diagonally between said cord stitched along the shoulder portions and intersecting to form a plurality of X shaped paths along the entire length of said camelback.

5. Camelback for recapping worn vehicle pneumatic tires, said camelback comprising a tread rubber layer and a protective layer of plastic material, cord stitched throughout substantially the entire thickness of the tread rubber layer exclusive of said plastic material and covering a substantial part of the area of the tread rubber layer.

6. The method of making camelback for recapping worn, vehicle pneumatic tires, comprising extruding a strip of tread rubber and while said tread rubber is still hot from extrusion stitching cord throughout the entire thickness of the tread rubber, and finally applying a protective sheet of plastic material.

7. The method recited in claim 6 wherein a layer of cushion gum is applied to said strip of tread rubber before said stitching.

8. Camelback for recapping worn vehicle pneumatic tires, comprising a layer of tread rubber, a coating of cushion gum thereon, a sheet of plastic material forming a protective covering over said coating of cushion gum, and cord portions extending only through the entire thickness of said tread rubber and cushion gum coating but not through said protective covering, said cord being of material pervious to air.

9. In the process of recapping a worn vehicle pneumatic tire, the method of bleeding air trapped between the carcass and the tread layer by passing it through a plurality of small holes in the worn tread layer and thence through a tread rubber strip impregnated with fabric, comprising buffing the worn tire, puncturing it with a plurality of small holes up to the carcass, adhering a strip of tread rubber impregnated with cords of a material to permit air seepage therethrough, whereby trapped air in the carcass and between the buffed surface and tread rubber will escape through said cords.

References Cited by the Examiner
UNITED STATES PATENTS

| | | | |
|---|---|---|---|
| 2,309,042 | 1/1943 | Boyle | 156—129 |
| 2,541,506 | 2/1951 | Cuthbertson et al. | 156—87 |
| 2,650,642 | 9/1953 | Reheiser | 156—114 |
| 2,710,042 | 6/1955 | Gates | 161—50 X |
| 2,725,835 | 12/1955 | Mather | 156—87 |
| 2,973,799 | 3/1961 | Kelly | 156—96 |
| 3,136,673 | 6/1964 | Carver | |

EARL M. BERGERT, *Primary Examiner.*

HAROLD ANSHER, *Examiner.*